United States Patent

Paz Rodriguez

[11] Patent Number: 5,164,250
[45] Date of Patent: Nov. 17, 1992

[54] FABRICS FOR CURTAINS, SUNSHADES AND SIMILAR APPLICATIONS

[76] Inventor: Gerardo Paz Rodriguez, C. Diputacio, 391-395, 08013 Barcelona, Spain

[21] Appl. No.: 179,957

[22] Filed: Oct. 21, 1991

[30] Foreign Application Priority Data

Oct. 19, 1990 [ES] Spain .................................. 9002936

[51] Int. Cl.$^5$ .................................. D03D 3/00
[52] U.S. Cl. .................................. 428/225; 428/226; 428/229; 428/255; 428/257; 428/258; 428/259
[58] Field of Search ............... 428/225, 229, 257, 226, 428/258, 259, 255

[56] References Cited

U.S. PATENT DOCUMENTS 4,097,631  6/1978  Wilken ............................ 428/226
4,590,121  5/1986  Mahr ............................... 428/258
4,626,465 12/1986  Henningsson ...................... 428/225
4,632,863 12/1986  Henningsson ...................... 428/225

Primary Examiner—James J. Bell
Attorney, Agent, or Firm—Steinberg & Raskin

[57] ABSTRACT

Base consisting in a leno fabric, with flexible strips incorporated into it longitudinally, in the direction of the warp, linked successively through each one of the weft courses, in such a way that the threads of same evolve by passing from the face to the back of the fabric, and successively, with respect to adjacent strips, in accordance with a taffeta texture. The flexible strips are arranged in groups of two or more, regularly or irregularly spaced apart from each other and with respect to the connecting warp threads, defining open bands for the passage of air and light.

5 Claims, 1 Drawing Sheet

FABRICS FOR CURTAINS, SUNSHADES AND SIMILAR APPLICATIONS

The present invention refers to improvements introduced in fabrics used for attenuation of light, both at domestic level (curtains, drapes) and, most especially, those used in agriculture, such as sunshades, hothouses and similar.

BACKGROUND OF THE INVENTION

This type of fabrics, particularly with respect to their industrial application, have so far been constituted by sets which include a series of successive and parallel pile-warps distributed throughout the length of the fabric and linked to each other, between two of which, whether across the entire width of the fabric or altenating regularly or irregularly with open spaces, the spaces left by said pile-warps are covered by means of inclusion, also in longitudinal direction, of flexible strips of appropriate materials which prevent, regulate or attenuate as desired the passage of light.

Fabrics of these types are described in Spanish Utility Models Nos. 284,531 and U8601630 (Swenson), in which the flexible strips are linked between the pile-warps on making the fabric itself.

Nevertherless, for the inclusion of said flexible strips, each of them must of necessity always be included between two parallel pile-warps, in such a way that the aeration spaces are always acheieved by leaving free longitudinal zones also between pairs of pile-warps, either in one, two or more longitudinal bands.

From the previous description it follows that known fabrics present some important drawbacks, for instance the fact that the fabric results necessarily very close-woven, thus hindering ventilation; or that, being the flexible strips completely flat, they don't favour good dispersion of the external light and of the internal infrared radiation.

Known fabrics present a further drawback in their low versatility, due to the facy that they don't allow the inclusion of several flexible strip between two pile-warps.

As can be understood, the results cannot always be as ideal as might be wished and, therefore, fabrics so formed do not comply with all the minimum application and utilization conditions.

The strips to be used for a good reflexion of the light and of the infrared radiation, must be formed of a mirror-like material; for this reason the mentioned features are useful, to obtain a betterr efficiency in the regulation of the desired microclimate. Nevertheless, to obtain other parameters that are necessary for a better growth of the plants (in the case of agriculture), they are formed including other materials, with the appropriate features according to each case.

DESCRIPTION OF THE INVENTION

The improvements object of the invention are aimed at solving the aforesaid problems, permitting the achievement of fabrics of better stability, in which the flexible strips are alternated with free spaces between them, without the need for them to be flanked by pile-warps or special links, while at the same time, given their structure, they allow greater versatility in the formatiom of zones of shadow and open ventilation or aeration spaces.

In accordance with the invention, the fabric formation, which comprises a gauze texture as warp, with weft of straight threads, between which pass the flexible strips, consists in weaving all the strips successively through each one of the weft courses, in such a way that the threads of same evolve by passing from the face to the back of the fabric, and successively, with respect to adjacent strips, in accordance with a taffeta texture. This provides fabric of total stability, in which the strips are arranged in groups of two or more, alternating with the connecting warp threads, between every two pairs of them, leaving free spaces between said strips or between same and the adjacent connection threads themselves.

In a variant embodiment, the distances between pairs of connecting warp threads are not uniform, so that between them can be arranged alternately groups of strips which are also unequal, in function of the shade and/or aeration effects which it is desired to achieve. Some spaces between connecting warp threads can even be left empty, with the same aim.

Finally, in a variant embodiment, and to lend greater cohesion to the fabric in certain zones, suppression of the spaces between connecting warp threads has been envisaged, in such a way that denser bands are formed, which will longitudinally reinforce the fabric obtained.

By means of all this, apart from ventilation and shade, complementary effects of decoration, reflection and the like can be achieved, which provide the fabric obtained with unsuspected application possibilities compared to similar fabrics known and used to date.

Furthermore, as can be understood, arrangement of the flexible strips in taffeta texture, linked to the gauze texture, at the same time as greatly simplifying manufacture of the fabric, also provides complete stability of said strips within it, redounding to the benefit of a better finish and duration in use, and favours the versatility of the fabric, which can be formed with a plurality of different arrangements of the flexible strips, transparent and/or opaque, and the free spaces for ventilation; furthermore, with the manufacture of the fabric in a shuttle loom, the flexible strips result undulating, thus favouring dispersion of external light and internal infrared radiation, and at the same time favouring ventilation, through the gaps resulting in the zone of contact of two adjacent strips, due to said undulation.

BRIEF DESCRIPTION OF THE DRAWINGS

For a better understanding of all that has been set forth, the present description is accompanied by some drawings in which, schematically and only by way of example, without any restrictive character, a practical case of embodiment of a fabric of the indicated characteristics is shown, in diverse embodiment variants, within the range of those possible in accordance with the invention.

In said drawings.

DESCRIPTION OF THE SHOWN EMBODIMENTS

Figure 1:
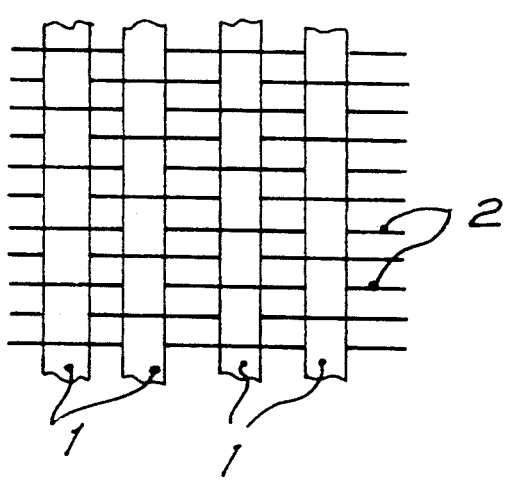
FIGS. 1 and 2 show diagrams of the two textures which make up the fabric, that is, the taffeta texture, which affects retention of the flexible strips, and the leno texture which forms the base of the fabric.
Figure 2:
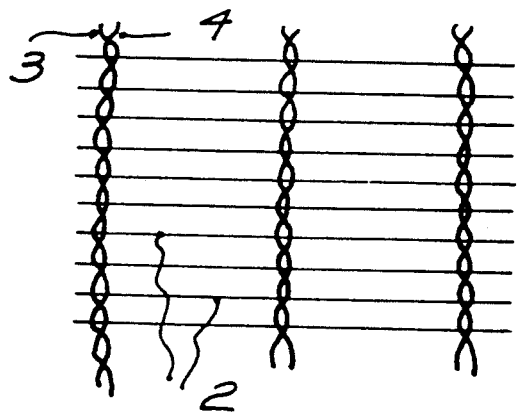

As can be observed in FIGS. 1 and 2, the fabric is made up of two different textures, brought together on a single base, the first (FIG. 1) being of taffeta type, in which the flexible strips —1— form the warp and the threads —2— constitute the weft. Furthermore, these same weft threads —2— are joined by other warp threads —3—4—, which cross each other on each weft thread —2— in leno texture and constitute the longitudinal connection element between the various weft threads —2—.

These threads —2—, as can be clearly appreciated, evolve on the adjacent strips —1— passing from the face to the back of the fabric, in such a way that the strips —1— are secured between same, and the whole set is retained and stabilized by the connecting warp threads —3—4—.

The strips —1— form groups of two or more between each two threads of connecting warp —3—4—, leaving between them and with respect to said threads —3—4— free spaces —5— which allow a more intense or less intense passage of air and light.

Figure 3:
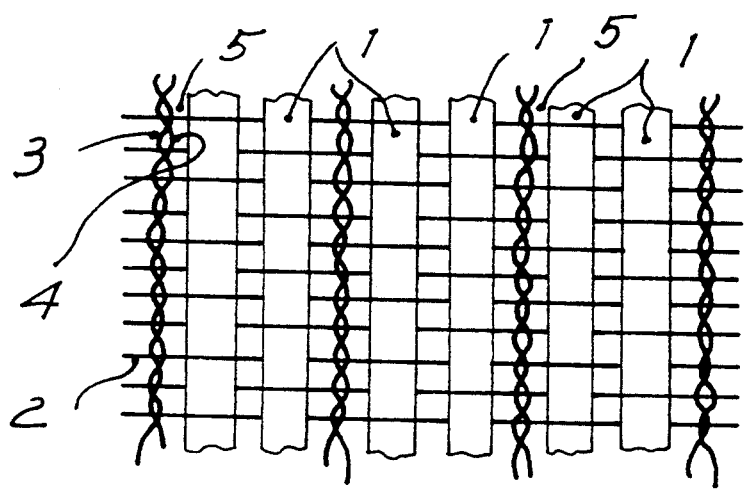
FIG. 3 corresponds to a similar view of the complete fabric.
Figure 4:
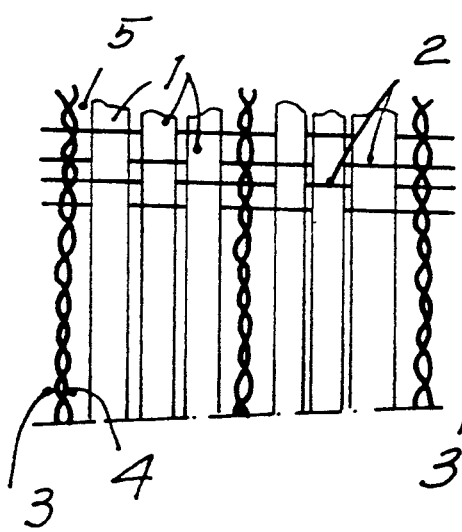
FIGS. 4 and 5 are likewise views of fabrics made according to respective variants, within the same conception.

FIG. 3 corresponds to a fabric which presents between its connecting warp thread —3—4— groups of two spaced-apart flexible strips —1—, while FIG. 4 corresponds to a similar fabric, with groups of three strips (FIG. 4).

Figure 5:
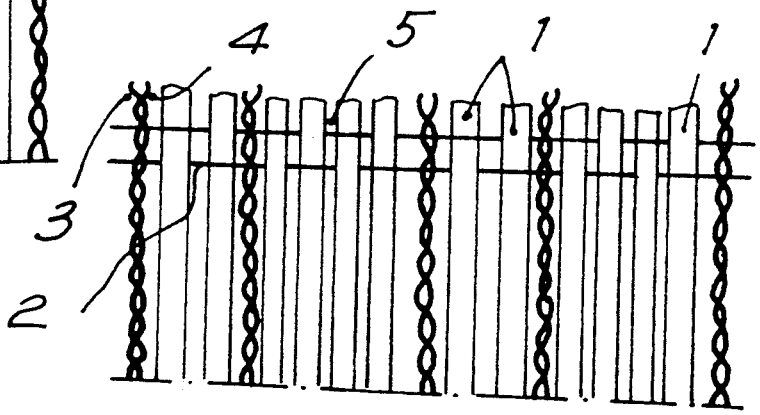

FIG. 5 shows a variant embodiment in which the distances between the courses of connecting warp threads —3—4— are different from one another and, therefore, each of the spaces between them present, alternately, groups of two and three strips, respectively.

In another envisaged embodiment variants, spaces free of flexible strips —1— may even be left between connecting warp threads —3—4—, in such a way that the amount of light or aeration desired may be varied at will.

Zones may even be left in which the courses of connecting warp threads are juxtaposed adjacently, without space between them, so that the fabric will be provided with supplementary longitudinal reinforcement and aeration will be carried out solely through the interstices left between the crossing over of the threads —3—4— of each course with the weft threads —2—.

In any case, it is clear that thanks to this fabric system, obtained in accordance with the improvements indicated, absolute stability is achieved between the flexible strips —1— and the gauze fabric base formed by connecting warp threads —3—4— and weft threads —2—, while thanks to the various combinations possible, it is feasible to obtain decorative effects, aeration and shade, which means that the fabrics obtained can be put to domestic and industrial use, although they are intended especially for the latter, particularly with reference to hothouses, sunshades and similar applications in which a fundamental role is played by the two factors highlighted: light and aeration.

As can be understood, fabrics made in accordance with the invention can be menufactured with any appropriate machines and applied to the purposes indicated, without limitation.

I claim:

1. Improvements in fabrics for curtains, sunshades and similar applications, in which the base is formed by a leno fabric, with flexible strips incorporated into it longitudinally, in the direction of the warp, characterized in that all the flexible strips are linked successively through each one of the weft courses, in such a way that the threads of same evolve by passing from the face to the back of the fabric, and successively, with respect to adjacent strips, in accordance with a taffeta texture.

2. Improvements in fabrics for curtains, sunshades and similar applications, as claimed in claim 1, characterized in that the flexible strips are arranged in groups of two or more, alternating with the connecting warp threads, said strips resulting spaced apart from one another and with respect to the courses of connecting warp threads, forming open bands for the passage of air and light.

3. Improvements in fabrics for curtains, sunshades and similar applications, as claimed in claim 1, characterized in that the spaces left between the various courses of the connection warp threads are of the same width, groups of two or more strips, separated from each other, being arranged in said spaces.

4. Improvements in fabrics for curtains, sunshades and similar applications, as claimed in claim 1, characterized in that the distances between the various courses of connecting warp threads are different from each other, whether regularly or irregularly, groups of flexible strips in variable number being arranged between the connecting warp threads, said strips being separated from each other, in accordance with the area defined.

5. Improvements in fabrics for curtains, sunshades and similar applications, as claimed in claim 1, characterized in that there is envisaged arrangement, in predetermined zones of the fabric, of several adjacent courses of connecting warp threads, for reinforcement of the fabric and variation of aeration and shade in said zones.

* * * * *

UNITED STATES PATENT AND TRADEMARK OFFICE
CERTIFICATE OF CORRECTION

PATENT NO. : 5,164,250
DATED : November 17, 1992
INVENTOR(S) : Gerardo Paz Rodriguez It is certified that error appears in the above—identified patent and that said Letters Patent is hereby corrected as shown below:

On title page, item [21], should read --779,957--

Signed and Sealed this

Twenty-sixth Day of October, 1993

Attest:

BRUCE LEHMAN

Attesting Officer

Commissioner of Patents and Trademarks